United States Patent [19]

Hewes, Jr.

[11] 3,916,839

[45] Nov. 4, 1975

[54] STOCK DIPPING APPARATUS

[76] Inventor: Francis W. Hewes, Jr., Toponas, Colo. 80479

[22] Filed: May 9, 1974

[21] Appl. No.: 468,466

[52] U.S. Cl. .................................. 119/158; 119/158
[51] Int. Cl.² ........................................ A01K 13/00
[58] Field of Search ............................ 119/156, 158

[56] References Cited
UNITED STATES PATENTS

| | | | |
|---|---|---|---|
| 1,152,910 | 9/1915 | Roberson | 119/158 |
| 3,208,434 | 9/1965 | Barton | 119/158 |
| 3,835,815 | 9/1974 | Matthews | 119/158 |

FOREIGN PATENTS OR APPLICATIONS

| | | | |
|---|---|---|---|
| 7,794 | 11/1907 | United Kingdom | 119/158 |

Primary Examiner—Louis G. Mancene
Assistant Examiner—Peter K. Skiff
Attorney, Agent, or Firm—Sheridan, Ross & Fields

[57] ABSTRACT

Stock dipping vehicle characterized by a conveyer with a controllable width exit for stopping movement of an animal therethrough and for preventing retrograde movement of the animal, a dipping vat with dunking apparatus for submerging the animal and having an inclined exit ramp, together with a false perforate bottom pivoted adjacent the outlet of the vat adapted to be lifted, when necessary, to raise the animal from the dipping solution to prevent drowning, an air blast device adjacent the outlet of the vat for removing and recovering excess liquid on the animal, and a hinged exit door which, when opened, serves as an exit ramp. Hinged side barriers are provided at sides of the path of animal movement for preventing an animal from exiting over same when the barriers are in elevated position and, when lowered, they reduce the overall height of the vehicle to comply with vehicle height regulations and permit it to move beneath overhead road obstructions.

40 Claims, 17 Drawing Figures

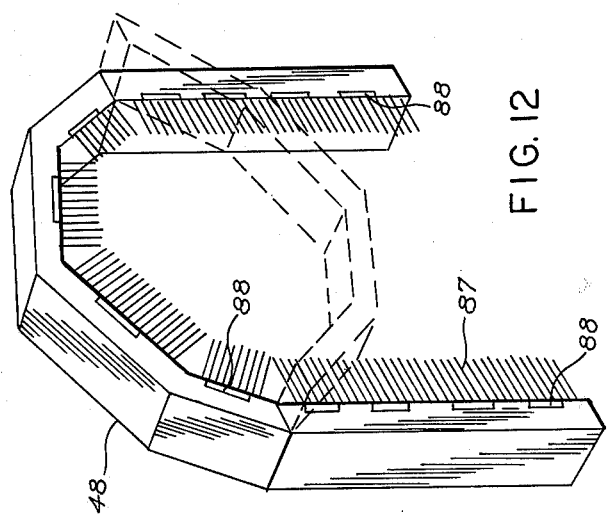
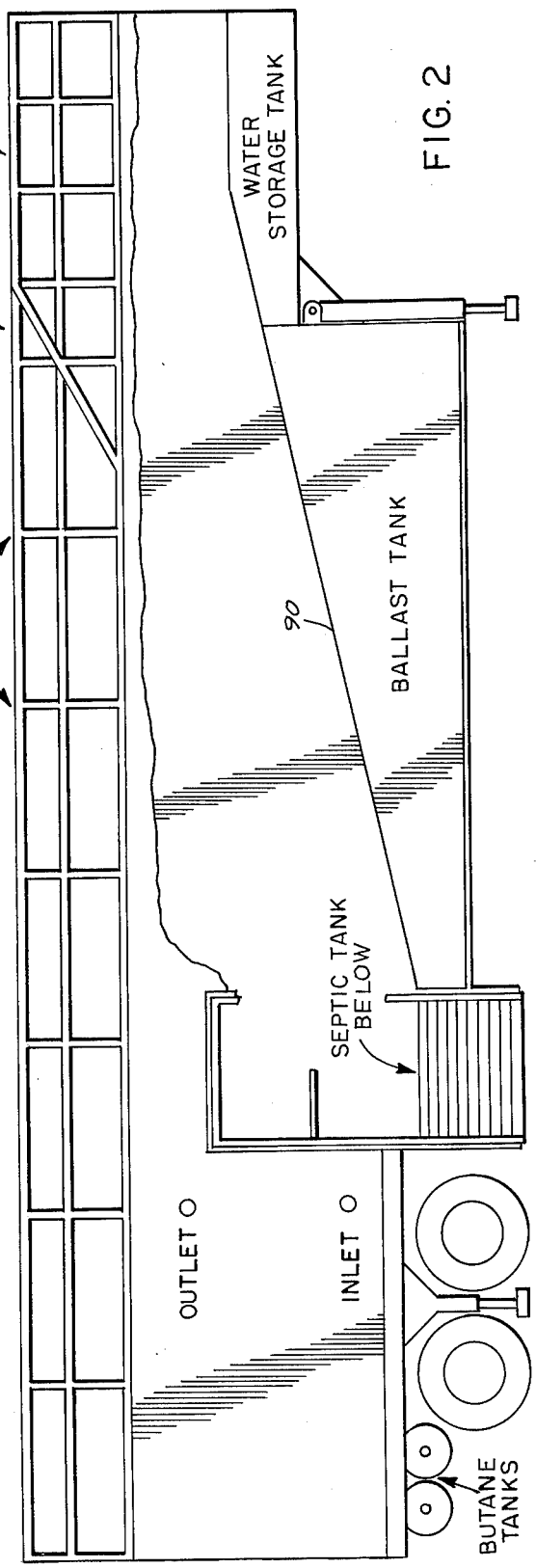

STOCK DIPPING APPARATUS

BACKGROUND OF THE INVENTION

In the art of dipping of livestock, such as cattle, sheep and others, for exterminating vermin, scabies and the like carried thereby, several techniques are employed, each of which has its advantages and economies depending upon the circumstances involved. For example, the livestock operator who has a sufficiently large herd usually employs a stationary dipping vat and the animals are herded thereto for processing. For the operator with a relatively small herd this technique is usually uneconomical due to the high cost of the equipment involved and the high cost of chemicals. He thus usually transports his livestock to the locus of a fixed vat and pays a fee for the dipping. This, of course, entails cost of transportation to and from the dipping locus together with the attendant loss of animal weight during transportation. Another technique which obviates the costs and losses just referred to and which is attractive and economical for the small operator is to provide mobile apparatus which may be moved to the situs of the herd. Such devices are exemplified by patent 3,208,434 to Barton wherein a semi-trailer is provided which includes ramps for driving cattle into a dipping vat and egress ramps for returning them to ground level. The present invention relates to apparatus of this general type which may be transported to the animal situs, differing therefrom in that various refinements are provided and which will subsequently appear.

SUMMARY OF THE INVENTION

The apparatus comprises a semi-trailer which is longitudinally partitioned centrally thereof to provide a path for entry, dipping, dunking, raising from the dipping liquid, and an air blast for removing excess liquid as an animal exits from the dipping vat. The animal then follows a 180° path at the front end of the trailer and exits through a side door which, when lowered to a suitable position, serves as a ramp for exit onto the ground or when suitably elevated onto the elevated bed of a vehicle, such as a truck or trailer. Animals are driven up a conveyor ramp for entry into the vat. The conveyor ramp is power operated for use to transfer balky animals into the dipping vat.

Convergent side walls are provided adjacent the conveyor ramp which may be adjusted to provide an exit throat of desired width to prevent passage of more than one animal, one of which may be moved to a squeezing position against an animal for preventing retrograde movement of an animal and also for capturing the animal against movement into the vat. The capturing operation is performed when it is observed that an animal in the vat has become inverted and drowning is likely. In this event, the conveyor, if moving, is stopped with an animal captured therein and a false bottom in the vat is raised, lifting the submerged animal above the liquid in the tank.

A power operated dunker is also provided to ensure that an animal is completely submerged in the vat, as required by dipping regulations, and an air blast of hot or cold air is directed on an animal as it emerges from the vat, thus minimizing subsequent dripping and loss of dipping liquid. Brushes may be mounted on the internal surface of the dryer to aid in removal of dipping solution. In the past, dipped cattle were required to stand in a catch pen for drainage of dipping liquid.

A plurality of hinged barriers are provided at the sides of the animal path which extend sufficiently high to prevent animals jumping or climbing over the barriers. When these are lowered for transportation of the vehicle over highways the overall height of the vehicle is such that it complies with road height regulations.

The movable instrumentalities are operated by hydraulic motors or rams under pressure produced by an internal combustion engine driven closed circuit pump and controlled by valves at an operator's station where the movement of the animals may be observed and corrective measures taken when necessary. The engine also drives a liquid pump which is disposed in a circuit including manifolds and valves for communicating liquid to or from any of the various tanks to or from any of the others. One example of this transfer is to lower the liquid in the dipping vat and transfer it to a ballast tank disposed in a position to transfer the center of mass of the liquid to a longitudinal central axis of the vehicle to thus obviate eccentric loading which, under some conditions of road travel, could render the vehicle subject to tipping over onto the dipping tank side of the vehicle.

One of the objects of the invention, consonant with the foregoing, is the provision of an improved mobile dipping apparatus which may be transported to the situs of animals as distinguished from transporting or otherwise moving animals to the dipping situs.

Another object is to control movement of animals from a chute and as they are transferred from a conveyor ramp into a dipping vat.

Another object is to discontinue animal movement on the conveyor ramp in the event an animal turns over in the dipping vat and is likely to drown.

Another object is to raise the turned-over animal above the liquid in the vat to prevent drowning.

Another object is to forceably dunk an animal so that it iss temporarily completely submerged and entirely wetted with dipping liquid.

Another object is to minimize dripping of a wetted animal and recover some of the liquid by employing an air blast and brushes on an animal as it emerges from the dipping vat.

A further object is to provide an animal exit ramp which is adjustable to deliver an animal onto the ground or onto the raised bed of a truck or trailer.

Still further objects, advantages, and salient features will become more apparent from the detailed description to follow, the appended claims, and the accompaning drawing to now be briefly described.

BRIEF DESCRIPTION OF THE DRAWING

FIG. 2 is a side elevation;

FIG. 12 is an isometric view of the air blast duct or dryer;

FIG. 17 is a detail of a flexible lock between panels.

DETAILED DESCRIPTION OF PREFERRED EMBODIMENT

Figure 1:
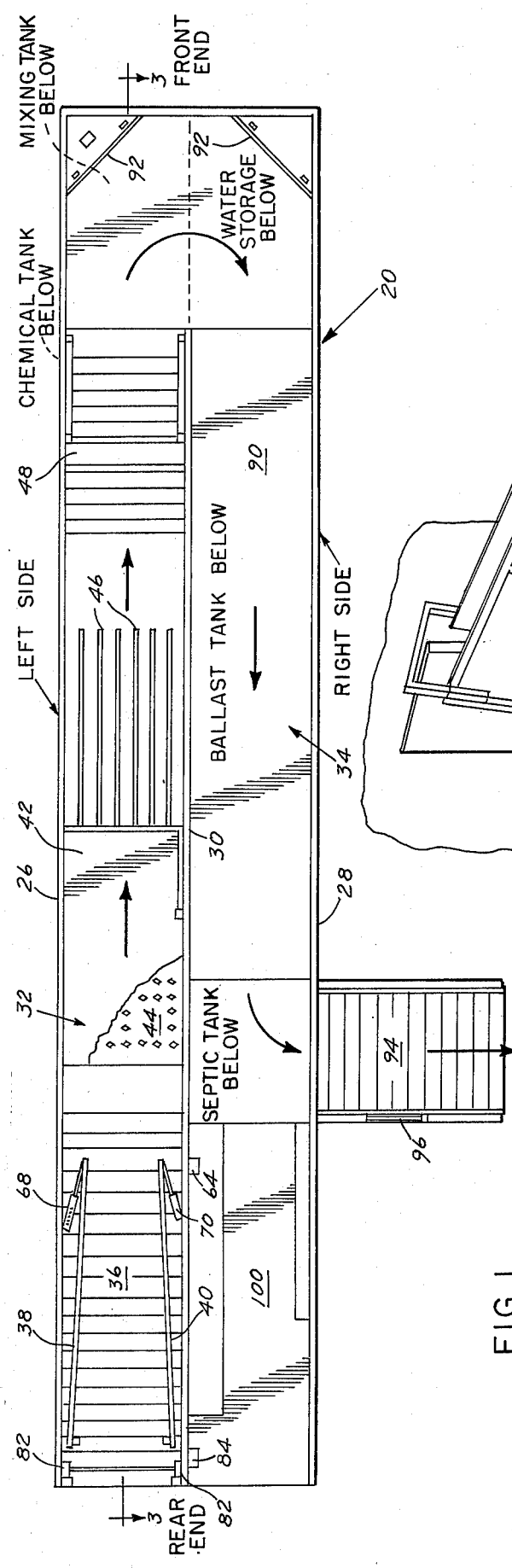
FIG. 1 is a schematic floor plan of the subject of the invention.
Figure 4:
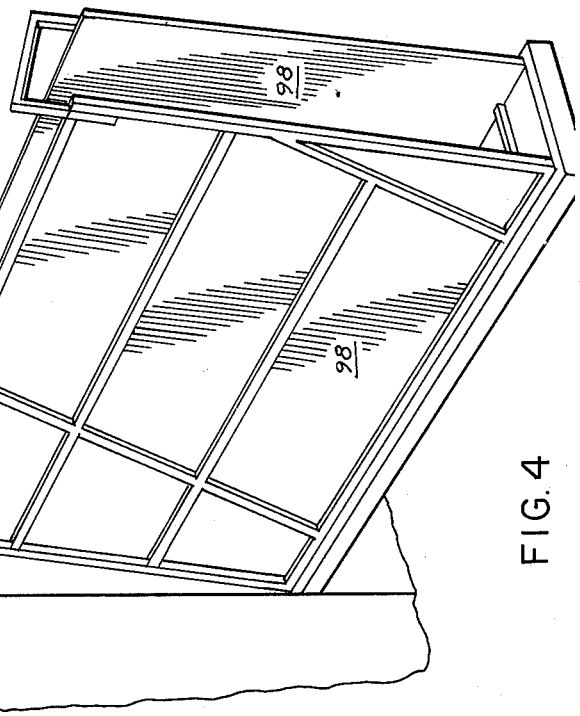
FIG. 4 is a perspective view of the exit chute.
Figure 3:
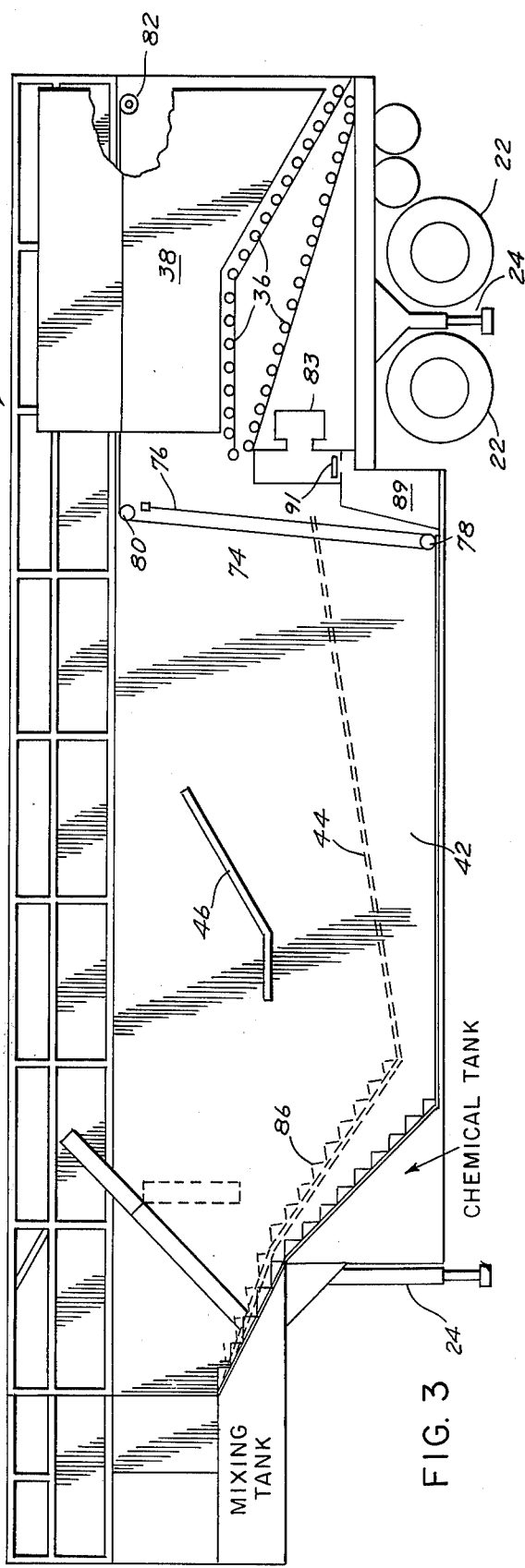
FIG. 3 is a schematic section as viewed along line 3—3, FIG. 1.
Figure 6:
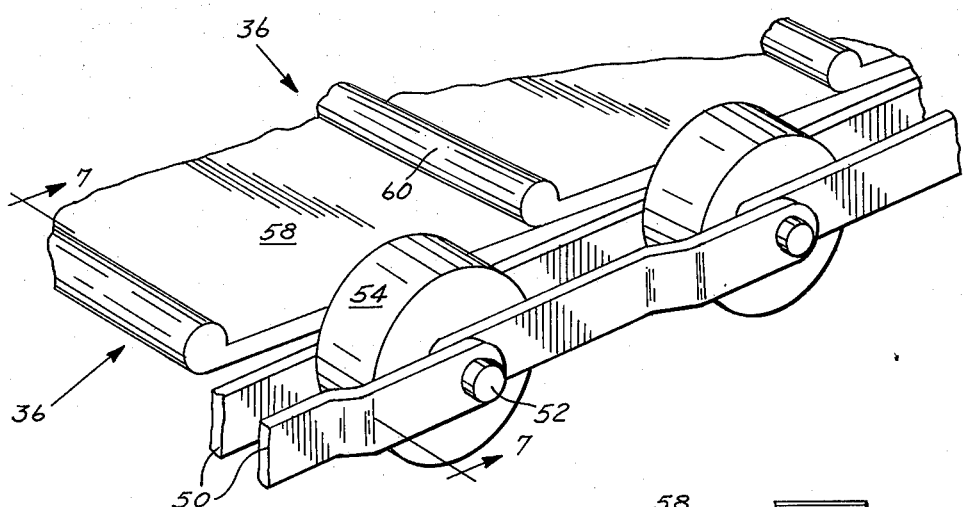
FIG. 6 is an isometric view of a portion of the conveyor.
Figure 7:
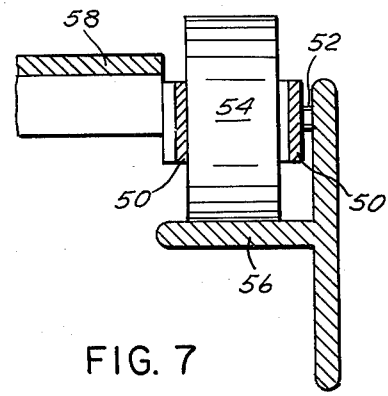
FIG. 7 is a section taken on line 7—7, FIG. 6.
Figure 5:
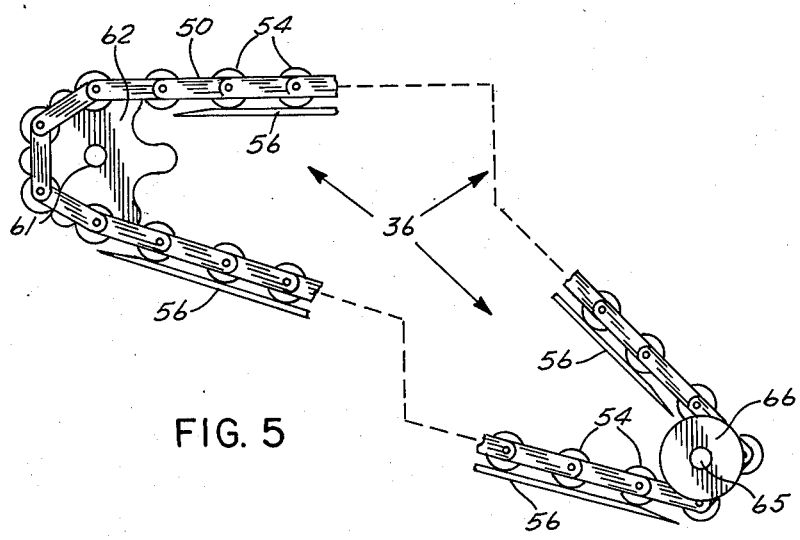
FIG. 5 is a side elevation of the conveyor, the central portion being broken out.
Figure 8:
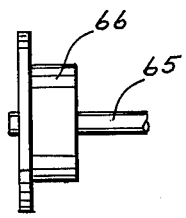
FIG. 8 is an elevation of an idler roller, forming part of the conveyor.

Referring now to the drawings and first to FIGS. 1–3, semi-trailer 20 is provided with the usual wheels 22 adjacent its rear end, its front end adapted to be connected to a towing tractor by a so-called "fifth" wheel (not shown). Right and left hydraulically operated outriggers 24 are also provided at four suitable points for leveling and supporting the trailer when detached from the towing truck, all of which are conventional trailer construction.

Referring particularly to FIG. 1, the truck chassis is provided with a left wall 26, a right wall 28 and a central wall 30 which provides two adjacent passageways 32,34 through which the animals move in the direction indicated by the arrows. Passageway 32 includes entrance conveyor 36, side barriers or squeeze doors 38,40, dipping tank or vat 42, false perforate bottom 44, dunker 46 and air blast duct or manifold 48 for drying and removing excess dipping solution, all of which will now be described in greater detail.

CONVEYOR

Referring to FIGS. 1, 3 and 6–8, conveyor 36 comprises right and left sets of paired links 50 pivotally connected together by pins 52 which carry rollers 54 which roll along right and left tracks 56. Plates 58, having cross cleats 60 thereon, are welded to the links 50 so that the plates provide a movable floor for carrying the animals into the dipping vat. As will be understood, the entry end of the conveyor forms a continuation of a stationary chute (not shown) through which the animals move onto the conveyor which may be stationary, or movable for balky animals. The front upper end of the conveyor is provided with a cross shaft 61 having a pair of sprockets 62 which engage the rollers, the cross shaft being driven by a hydraulic motor and reduction gear 64 (FIG. 1). The rear and lower end of the conveyor is supported by a like cross shaft 65 having a pair of flanged idler rolls 66 thereon around which rollers 54 are trained. As will be understood, the details of the conveyor are exemplary only and it may be modified as desired so long as it serves the intended purpose of transporting animals without slipping or losing their footings thereon.

CONVEYOR SQUEEZE DOORS

Referring to FIG. 1, adjustable doors or gates 38,40 are pivoted about vertical axes at their entry ends so that they may be adjusted to form a chute which is convergent in width. Door 38 may be adjusted to a fixed position by a suitable adjustable link 68 and door 40 is adjustable under control of the operator through a hydraulic ram 70. Door 40 can be moved by the operator to completely close the throat to stop the travel of animals in case an animal is in trouble in the vat.

DIPPING TANK OR VAT

Figure 9:
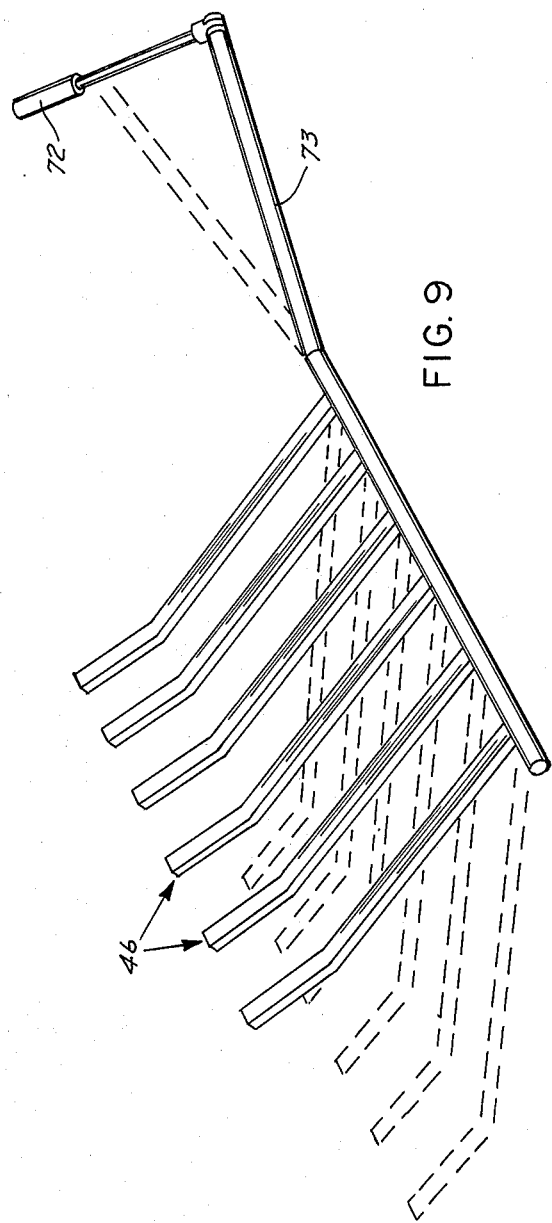
FIG. 9 is an isometric view of the dunker.

As best shown in FIG. 3, tank or vat 42 is provided with horizontal bottom and is maintained at a liquid level such that an animal must swim along its length after dropping or jumping from the delivery end of the conveyor ramp. Usually, the entire animal, including its head, will be temporarily submerged in the liquid when it jumps or falls from the conveyor. In some instances, however, the animal may not be completely submerged during its plunge into the tank which will be observed by the operator. In this event, the operator swings dunker 46 downwardly by hydraulic ram 72 and crank arm 73 (FIG. 9), completely submerging the animal temporarily. Another important feature of the dipping tank resides in false perforate bottom 44 which is pivoted at its upper and downstream end so that it may be elevated, the dotted lines showing it in partially elevated position. This is attained by a pair of cables 74, each fixed at its upper end 76, trained about idlers 78 and thence over idlers 80 to winch reels 82 which are operated by a hydraulic motor and speed reducer 84 (FIG. 1). Stairs or cleats 86 are provided at the exit end of the false bottom to permit the animal to normally climb out of the vat. When the false bottom is raised to lift the animal which is in trouble above the liquid level, the animal, being on an angled surface, can slide or roll to the exit end. The increased pitch of its bottom and decreased pitch of the final stairs facilitate movement of the animal out of the vat.

Another feature associated with the dipping vat resides in U-shaped air blast manifold or duct 48 (FIG. 12), which may have brush bristles 87, and apertures 88 for delivering a blast of air onto the animal as it emerges from the vat, thus removing excess liquid which might otherwise be lost through drippings. The upper portion of the manifold is hinged to swing between the full and dotted positions of FIGS. 3 and 12 to reduce overall height of the vehicle during its movement over a highway. When it is elevated, it is suitably locked and the parts interfitted to prevent loss of air in the hinged joints. Suction can also be applied to the manifold 48 to remove dipping liquid.

A two-stage heater 89 (FIG. 3) is mounted at the rear end and bottom of the dipping tank. It serves to control the temperature of the liquid in the dipping tank. Also, it can be used in connection with the blower 83 and damper 91 to provide hot or cold air to the dryer. The air is sucked through the furnace to provide oxygen for the furnace. The blower is a variable speed blower.

EXIT PASSAGEWAY

When an animal emerges from the dipping tank it is now approaching the front end of the trailer. It then makes a 180° turn as shown by the curved arrow at the right side of FIG. 1 and proceeds downwardly on declining floor of passageway 90, as best shown in FIG. 2. A pair of angular walls 92 (FIG. 1) are preferably provided at the front corners to guide the animal in making the 180° turn. They may be provided with removable top portions used during dipping (not shown).

EXIT RAMP

When the animal descends to the lower end of floor 90 it makes a 90° turn, as indicated by the second curved arrow, (FIG. 1), and emerges from the apparatus on a ramp or chute 94. The ramp is pivotally connected to the trailer and its inclination may be controlled by a hydraulic ram 96. As shown in FIGS. 1 and 2, it is lowered to permit an animal to emerge at ground level. If, however, it is desired to deliver an animal to the elevated bed of a truck or trailer, it may be suitably elevated to the desired exit elevation. When completely raised it forms a door for closing the exit opening in the side of the trailer. This not only places the door in a transportable position but precludes unauthorized access into the trailer.

The ramp 94 is also provided with a knock-down barrier with vertical panels 98 at the sides of the exit ramp or chute. This may be releasably secured to the ramp in any suitable manner, and when detached, it may be stowed within the vehicle, such as in the exit passageway. The panels are also preferably of parallelogram shape so that the upper and lower edges are parallel with the declination of the ramp when lowered to ground level, as shown, thus disposing entry and exit edges in generally vertical position. They may be reversed endwise, however, when the exit ramp is upwardly inclined to deliver an animal to a truck bed, in which event the upper and lower edges are still parallel with the ramp and the front and rear edges are approximately vertical, (depending upon the height of the bed of the truck to which an animal is delivered).

HINGED BARRIERS OR LIDS

During the movement of an animal through a passageway, it may panic and attempt to climb over side barriers. This tendency is compounded when the animal is subjected to an abnormal experience such as being subjected to dipping. The side barriers should thus be sufficiently high that forward motion is the only apparent avenue of escape, rather than over the sides of the barriers. Due to the dimensions of the apparatus, such as necessary ground clearance, depth of liquid in the dipping tanks, necessary elevation of the conveyor, etc. the height of the trailer walls would not be sufficient to prevent escape over the sides thereof if the apparatus were restricted to road height limitations. (13.6 foot in Colorado and approximately the same elsewhere). To obviate this, the passageways include foldable portions, which when folded down, provide a vehicle height of about 11 feet and, when raised, provide a vehicle height of about 15.5 ft. The dimensions thus conform to highway regulations and also provide adequate height to prevent undesired egress of an animal over the sides of the barriers. When lowered, the lids also serve the purpose of preventing unauthorized ingress to the vehicle, and particularly the dipping tank by children or other unauthorized personnel who might accidentally be injured or drowned. The squeeze doors 38 and 40 are also provided with like foldable or telescoping lids.

FIG. 2 illustrates barriers or lids at the center and right side of the trailer in raised position these being right front lid $L_1$ and center lid $L_5$. As will be apparent, the lower portions are imperforate and their upper portions form open grids.

Figure 13:
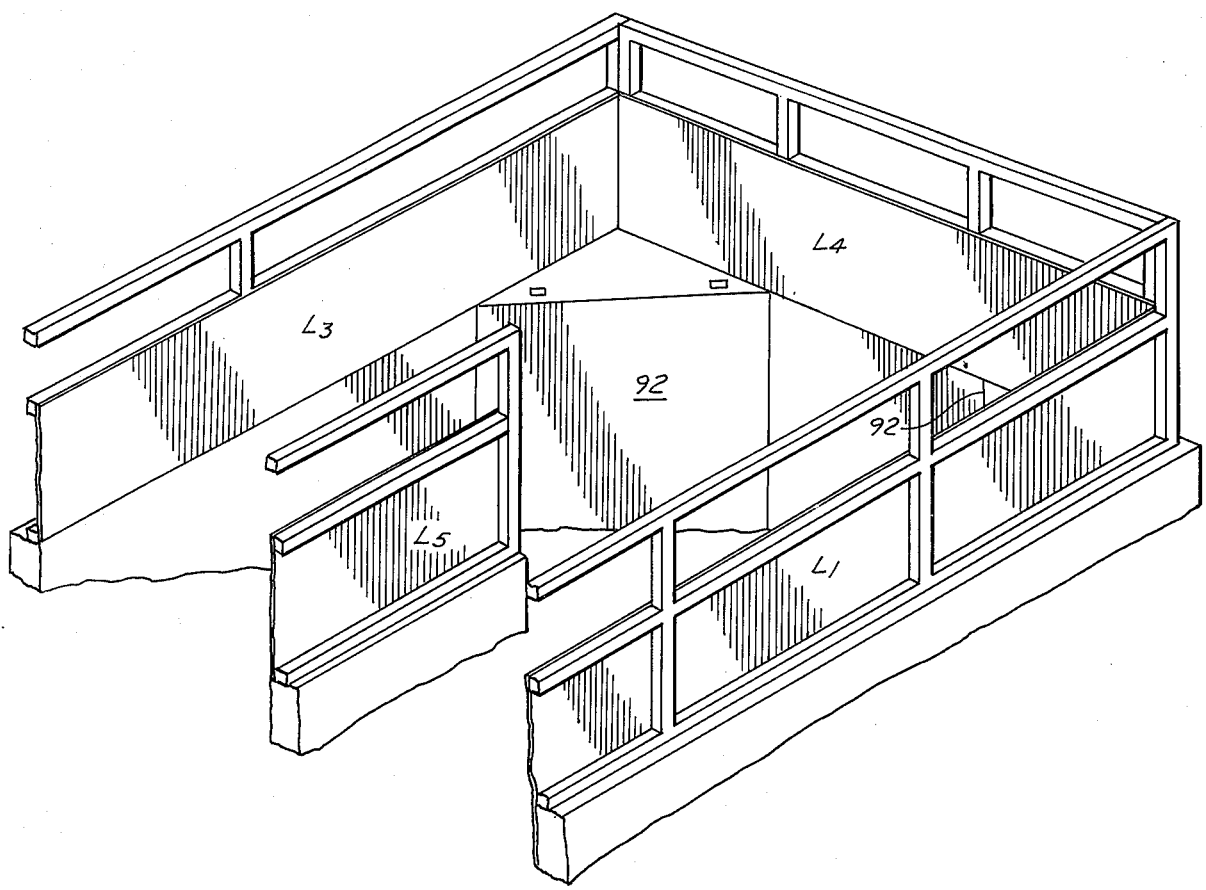
FIG. 13 is an isometric view of a portion of the extensible panels or lids at the front end of the trailer, shown in raised positions.
Figure 14:
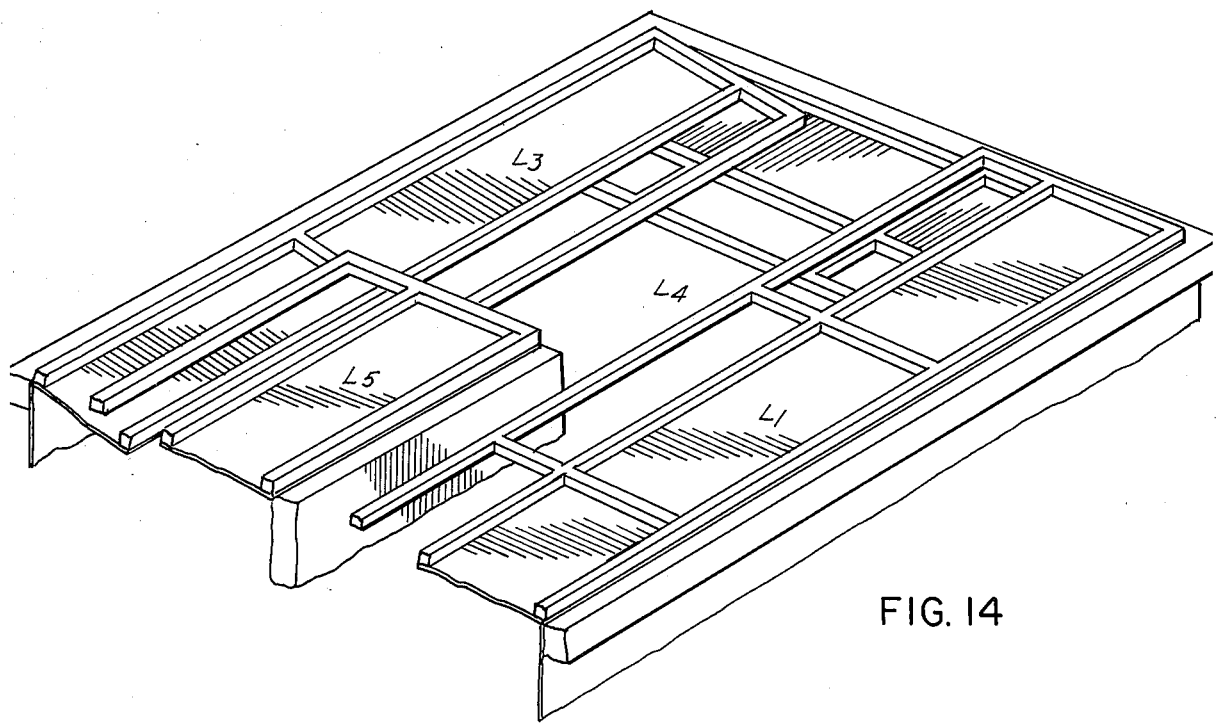
FIG. 14 is a like view showing the panels in closed positions.

FIG. 13 illustrates the front end of the trailer at the animal turning locus, showing left side lid $L_3$ at the opposite side thereof, front lid $L_4$ at the front end thereof, and center lid $L_5$ extending longitudinally thereof centrally between right fron lid $L_1$ and left side lid $L_3$. Each of these lids or barriers may be individually moved between folded and raised position under control of its hydraulic rams. Alternatively, the lids may be made with telescoping or other construction rather than being hinged. FIG. 14 illustrates the folded position in which $L_4$ is first lowered, $L_1$ and $L_3$ next lowered and $L_5$ lowered on top of $L_3$.

Figure 15:
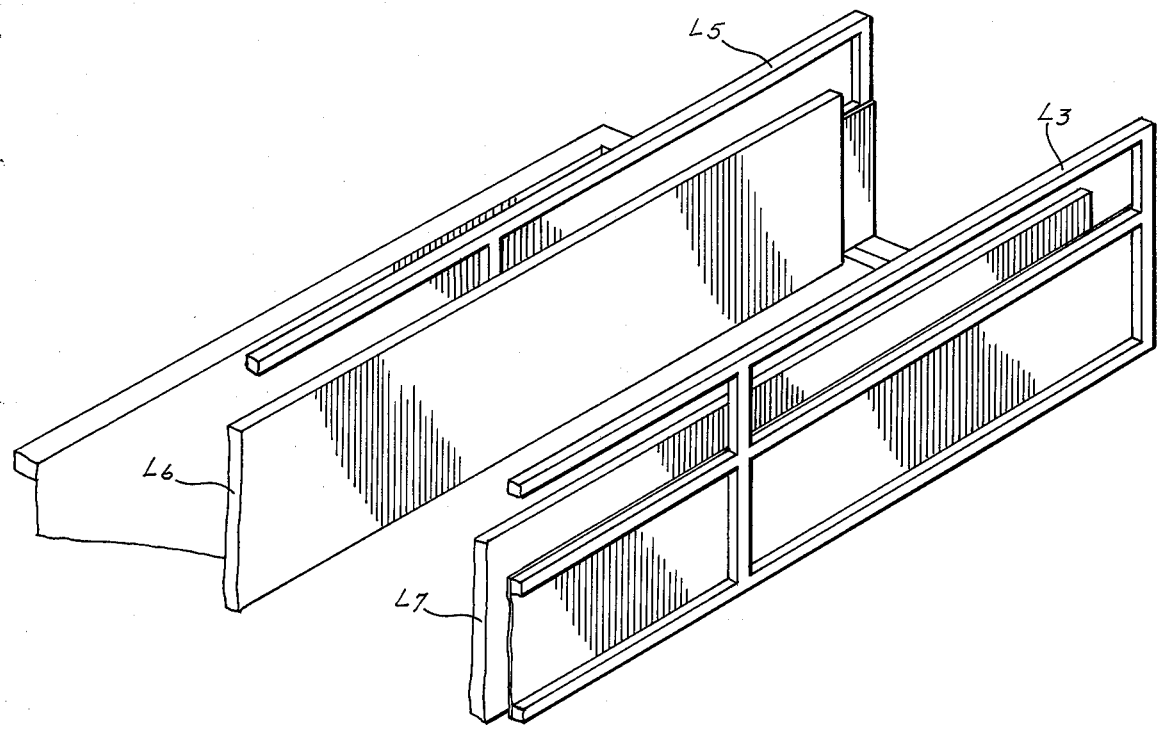
FIG. 15 is an isometric view of panels at the rear end of the trailer, shown in raised positions.
Figure 16:
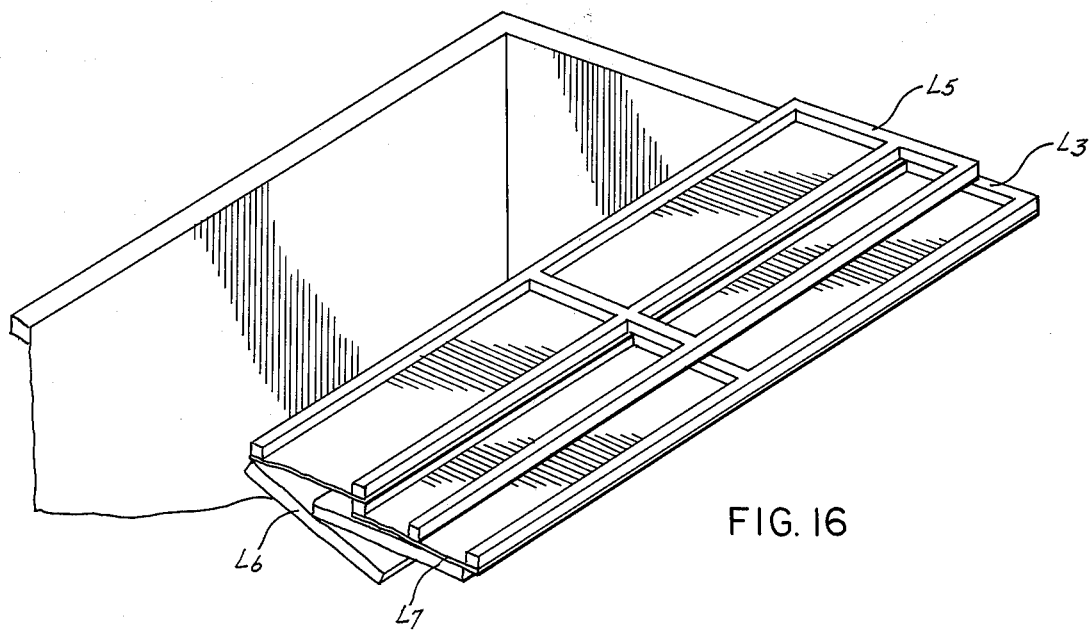
FIG. 16 is a like view showing the panels in closed positions.

FIGS. 15 and 16 illustrate, respectively, raised and lowered positions of the squeeze door lids $L_6$ and $L_7$, central lid $L_5$ and left side lid $L_3$ at the other and rear end of the trailer which are operated as described above with the squeeze door lids being folded as shown before the outer lids.

The long left side lid $L_3$ and center panel lid $L_5$ are constructed in longitudinal sections secured together at their adjacent ends by the movable flange type joint shown in FIG. 17 in which both flanges are secured at one end to the end of one panel section with their other ends overlapping but unsecured to the end of the adjacent panel. This provides some flexibility between these long sections during raising and lowering of the lids.

It is to be understood that the specific manner of folding and number of sections employed is not germane, the essential criteria being that the barriers or lids may be disposed in a position to confine an animal along its intended pathway and also provide, where not so used, an overall vehicle height which enables it to pass beneath overhead road obstructions and also comply with vehicle height regulations. Preferably, as indicated, the barriers, when closed, should prevent unauthorized ingress to the trailer from the top thereof which will normally be the only possible locus of ingress when the apparatus is not being employed for dipping animals.

POWER SYSTEM

Figure 10:
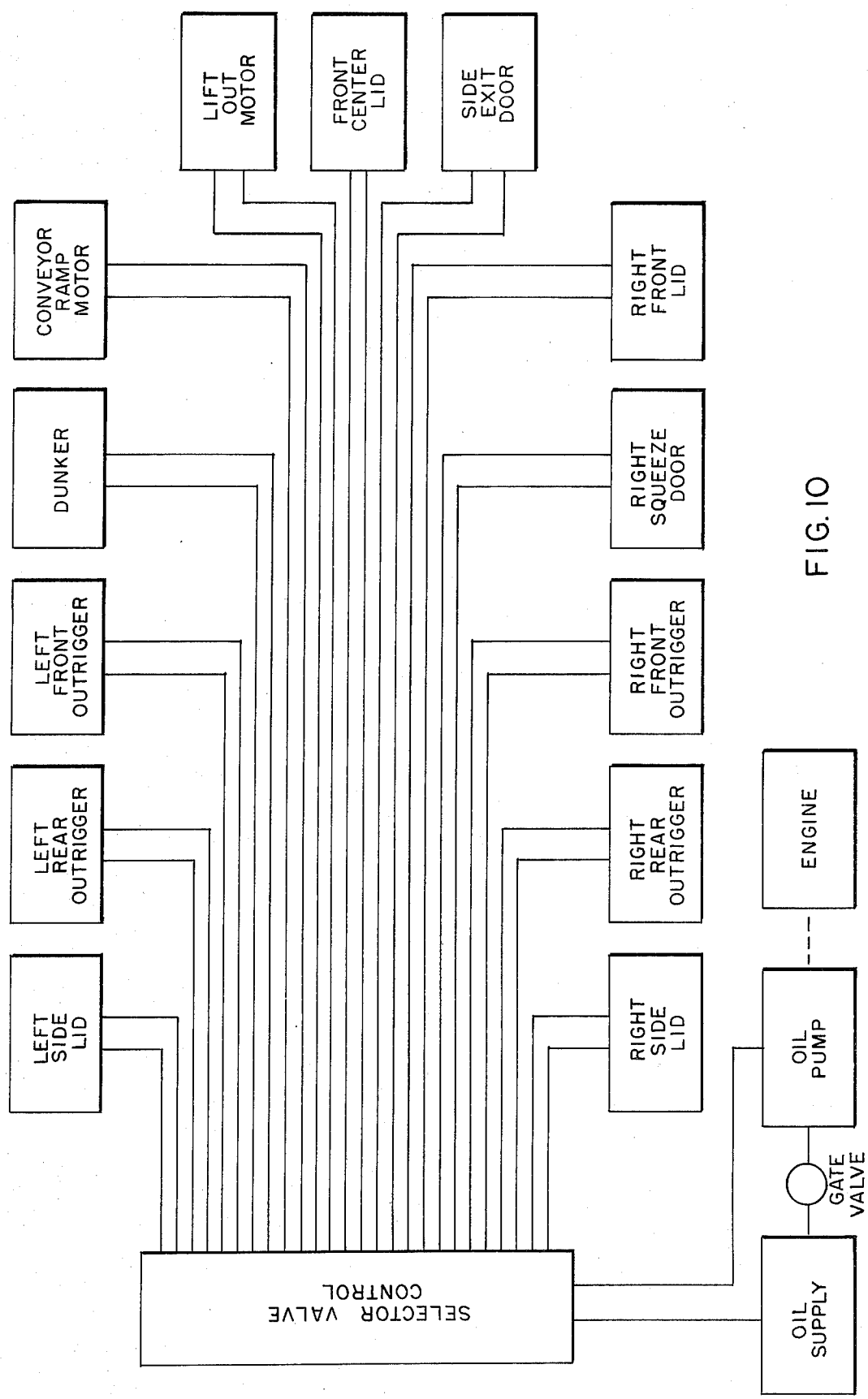
FIG. 10 is a schematic of the hydraulic system.

As diagrammatically illustrated in FIG. 10, the trailer is provided with an internal combustion engine which drives an oil pump which supplies oil under pressure to valves which may selectively deliver oil to the various movable labeled devices, the system being a closed circuit type for return to a sump or oil supply for recirculation. As will also be understood, any of the devices which require rotary motion, may be powered with rotary hydraulic motors, either uni-directional or reversible, as required, and any instrumentally which requires reciprocable movement may be operated by a hydraulic ram, either single acting or double acting, as may be needed. Also, suitable speed reducers may be employed with any of the motors.

LIQUID TRANSFER SYSTEM

Figure 11:
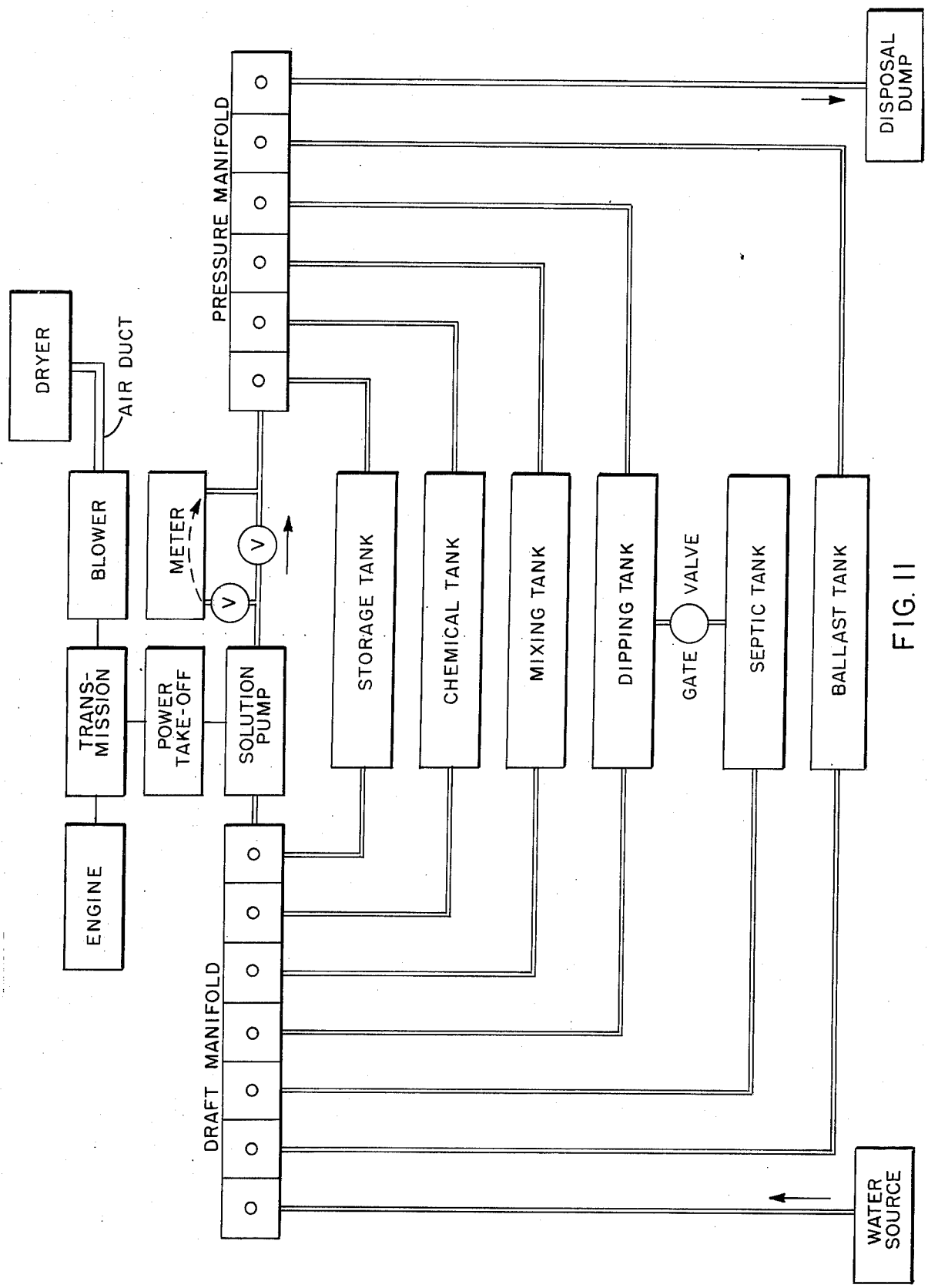
FIG. 11 is a schematic of the liquid system and dryer.

Referring to FIG. 11, the engine also is coupled to a selective speed transmission which operates a blower for delivering air to the dryer manifold 48 previously described. A power take-off also drives a solution pump which communicates with a suction or draft manifold and a pressure manifold. By suitable operation of valves (not shown) liquid may be transferred from any tank to any other tank with the exception of the septic tank which receives undersized debris from the dipping vat or tank through a gate valve which settles in the septic tank. Decanted liquid in the septic tank is then recirculated as desired, usually back to the dipping. The draft manifold also communicates with a water source which may be a creek, hydrant or stationary storage tank. The pressure manifold also communicates with a disposal dump for discharging spent liquid. Flexible hoses will normally be attached to inlet and outlet connections (FIG. 2) for these purposes. The tanks can also be drained from their bottoms by gravity flow. Also, a valve is provided between the solution pump and pressure manifold which may be closed to by-pass liquid through another valve and through a flow meter, whereby the volumes of liquids flowing to the pressure manifold may be determined when this is desired.

TANKAGE

With reference to FIG. 2, the ballast tank is preferably disposed beneath floor 90 of the exit passageway and should be of a volume sufficient to contain about one-half the liquid contents of the dipping vat. Thus, when the dipping solution is still useable after a dipping operation about one-half of its contents may be transferred to the ballast tank so that the dipping vat and ballast tank contents have a combined center of mass in the plane of the longitudinal axis of the trailer, obviating eccentric loading. The amount of liquid transferred to the ballast tank may vary somewhat depending upon the overall loading on each side of the central plane of the tailer, but, as will be apparent, may compensate for any unequal loading.

The septic tank is disposed beneath the floor of the exit passageway at the locus where an animal makes a 90° turn to egress on the exit ramp. Its volume may be comparatively small, but sufficient to permit sludge, debris, etc. to settle for ultimate disposal and to permit decanting of uncontaminated liquid back to the dipping vat. It thus functions in a manner similar to a sewer system septic tank wherein debris settles and is trapped and relatively clear liquid overflows into a disposal field.

The water storage tank is disposed at the right front end of the trailer at the right side thereof, that is, beneath the floor of the animal turning station.

With reference to FIGS. 1 and 3, the mixing and storage tanks are disposed side by side at the front end of the trailer, that is, adjacent the storage tank. In the event it is desired to add dry chemicals to the mixing tank it may be provided with a removable cover forming a part of the floor of the turning station. Butane tanks may be carried at any convenient point such as illustrated in FIG. 2.

OPERATOR'S STATION

As best shown in FIG. 1, the operator's station 100 is disposed adjacent the conveyor where he may observe the travel of animals on the conveyor and through the dipping tank so that he may start or stop the conveyor as required, operate the squeeze doors as necessary, and operate the dunker and dipping tank false bottom or uplift.

The apparatus may be modified in various ways within the scope of the invention. Rather than being attached to a tractor it may be constructed with its own engine for transporting it. It may be used for washing rather than dipping cattle. It may be provided with electric shocking devices for shocking animals to expediate their expedite through the passageways. Counters may be used to record the number of cattle dipped. Lighting may be used for night dipping. Meters may be used for exact measurement of ingredients.

What is claimed is:

1. Apparatus for dipping animals comprising:
   an elongated dipping vat through which an animal is adapted to swim, said vat having an upwardly inclined exit end through which the animal may emerge;
   a ramp up which an animal moves into the vat;
   barriers at each side of the conveyor, at least one being swingable to form a convergent throat therebetween; and
   means for swinging same to capture an animal therebetween, whereby a captured animal is prevented from entering the vat until a submerged animal ahead of same in the vat exits or is extricated therefrom.

2. Apparatus in accordance with claim 1, including:
   dunking means disposed above the vat and movable downwardly under control of an operator for forcing an animal in the vat below the surface of the liquid therein.

3. Apparatus in accordance with claim 1 in combination with a mobile vehicle on which the named devices are mounted.

4. Apparatus in accordance with claim 3, wherein:
   the vehicle is provided with a central partition forming a pair of longitudinal parallel passageways which are connected together at one end of the trailer to permit the animal to move through a 180° turn, the named devices being disposed in one passageway and so arranged that an animal enters same at the rear end of the trailer, moves longitudinally to the front end, turns 180°, and then moves in the opposite direction to an exit in the other passageway.

5. Apparatus in accordance with claim 4, including:
   a ballast tank beneath the second named passageway to which liquid in the vat may be transferred to thereby shift the center of mass of the vehicle to a point midway between its sides to thereby obviate eccentric loading of the vehicle when in motion.

6. Apparatus in accordance with claim 4, including:
   a longitudinal central barrier between the passageways at the tops thereof, other like barriers at the tops of outer sides of the passageways, the barriers being of sufficient height to prevent an animal from climbing out of the passageways, the barriers being movable to a lowered position during movement of the vehicle to a stowed position at which the overal height of the vehicle complies with height limit regulations for permitting the vehicle to pass beneath overhead road obstructions.

7. Apparatus in accordance with claim 4, including:
   an engine carried by the vehicle for driving a hydraulic pump for operating the various movable devices on the vehicle and for driving a liquid pump for transferring liquids carried by tanks on the vehicle or to or from loci near the vehicle, such as a source of water supply or a locus of liquid disposal.

8. Apparatus in accordance with claim 4, including:
   an operator's station at which movement of animals may be observed, and controls thereat for controlling the operations of at least the conveyor, the barriers, the dunking means, and the false bottom.

9. Apparatus in accordance with claim 1, including:
   means disposed adjacent the exit end of the vat for delivering a blast of air onto the animal as it emerges therefrom for recovering a portion of liquid which would otherwise be lost through drippings.

10. Apparatus in accordance with claim 1 wherein the passageway is provided with an endless conveyor for moving a balky animal therethrough.

11. Apparatus for dipping animals comprising:
an elongated dipping vat through which an animal is adapted to swim, said vat having an upwardly inclined exit end through which the animal may emerge; and
means disposed at the sides and top of the exit end for removing dipping liquid from the animal as it emerges from the exit end to thereby recover a portion of liquid which might otherwise be lost through drippings.

12. Apparatus in accordance with claim 11 wherein said means comprises a manifold for delivering a blast of air onto the animal.

13. Apparatus in accordance with claim 11 wherein said means comprises brush bristles for brushing off liquid on the animal.

14. Apparatus for dipping animals comprising;
an elongated dipping vat through which an animal is adapted to swim, said vat having an upwardly inclined exit end through which the animal may emerge, and
power operated dunking means disposed above the vat and movable downwardly under control of an operator for forcing an animal in the vat below the surface of the liquid therein.

15. Apparatus for dipping animals comprising;
an elongated dipping container for holding a dipping liquid in which an animal is submerged for dipping;
a storage means for storing the ingredients for said dipping liquid;
a mixing container for mixing said ingredients;
means for transfer of said ingredients from said storage means to said mixing container; and
means for transfer of mixed dipping fluid from said mixing container to said dipping container.

16. The apparatus of claim 15 in which said transfer means includes a draft manifold and a pressure manifold adapted to be selectively placed in communication with said storage means, mixing container and said dipping container, and a liquid pump for applying draft to said draft manifold and pressure to said pressure manifold to effect said transfer.

17. The apparatus of claim 15 including a septic tank for receiving material from said dipping container.

18. The apparatus of claim 16 including means for communicating said draft manifold with a liquid for mixing with dipping ingredient and means associated with said pressure manifold for disposing of spent dipping material from said apparatus.

19. The apparatus of claim 15 in which said ingredient storage means includes separate storage containers for dipping ingredients and liquid for mixing with said dipping ingredients.

20. The apparatus of claim 15 in combination with a mobile vehicle on which the named devices are mounted.

21. The apparatus of claim 20 in which said transfer means includes a draft manifold and a pressure manifold adapted to be selectively placed in communication with said storage means, mixing container and said dipping container, and a liquid pump for applying draft to said draft manifold and pressure to said pressure manifold to effect said transfer.

22. The apparatus of claim 20 including a septic tank for receiving material from said dipping tank.

23. The apparatus of claim 20 including means for communicating said draft manifold with a liquid for mixing with dipping ingredient and means associated with said pressure manifold for disposing of spent dipping material from said apparatus.

24. The apparatus of claim 20 in which said ingredient storage means includes separate storage containers for dipping ingredients and liquid for mixing with said dipping ingredients.

25. The apparatus of claim 20 including a ballast container adapted to be placed in communication with said draft and pressure manifolds for transfer of liquid to said ballast container to balance said mobile vehicle during travel thereof.

26. Mobile apparatus for dipping animals comprising:
an elongated dipping container or vat for holding a dipping liquid in which an animal is submerged for dipping;
a storage container for storing liquid for mixing with dipping ingredients for making said dipping liquid;
a storage container for storing the dipping ingredients for mixing with said liquid;
a mixing container for mixing said liquid and said ingredients;
a ballast container for receiving liquid for balancing said mobile apparatus during travel;
a draft manifold, a pressure manifold and a liquid pump in communication with said manifold; and
means for selectively placing each of said containers in communication with each other through said draft and pressure manifolds.

27. Apparatus in accordance with claim 26 including a septic tank for receiving material from said dipping tank.

28. Apparatus in accordance with claim 26 including means for communicating said draft manifold with a liquid for mixing with dipping ingredient and means associated with said pressure manifold for disposing of spent dipping material from said apparatus.

29. Apparatus in accordance with claim 26 in which said dipping container has an upwardly inclined exit end through which the animal may emerge and including;
a false pervious bottom for the vat having a shape conforming to its bottom and exit end and having means, such as steps, at its inclined exit end up which the animal may climb from the vat;
means pivotally connecting the exit end of the false bottom for swinging movement about a horizontal axis; and
means for swinging the false bottom upwardly about its pivoted axis, whereby an animal submerged in the vat may be raised out of liquid therein to prevent drowning, the downward inclination of the false bottom and reduced upward inclination of its exit end, when elevated, adapted to facilitate movement of the animal from the vat.

30. Apparatus in accordance with claim 26 in which said dipping container has an upwardly inclined exit end through which the animal may emerge and including:
a ramp up which an animal moves into the vat;

barriers at each side of the conveyor, at least one being swingable to form a convergent throat therebetween; and means for swinging same to capture an animal therebetween, whereby a captured animal is prevented from entering the vat until a submerged animal ahead of same in the vat exits or is extricated therefrom.

31. Apparatus for dipping animals, comprising:

an elongated vat for containing liquid and having an animal entry end and exit end at opposite ends thereof, a false bottom disposed within the vat having a substantially horizontal first submerged portion above which the animal may normally swim after entering said entry end, said false bottom having an upwardly inclined exit second portion adjacent the exit end of the vat up which the animal may normally climb without assistance, means pivotally connecting both of said portions for bodily swinging movement upwardly about a horizontal axis adjacent the upper end of the second portion, whereby said first portion may be disposed in a downwardly inclined position and said second portion may be disposed in reduced upward inclination, and means for bodily swinging said false bottom from its first named position to its second named position, whereby an animal submerged in the vat may be raised out of the liquid therein to prevent drowning, the downward inclination of the first portion and reduced upward inclination of the second portion then adapted to assist movement of an animal toward the exit end of the vat.

32. Apparatus in accordance with claim 31, including:

an endless conveyor for moving an animal into the vat.

33. Apparatus in accordance with claim 32, including:

barriers at each side of the conveyor, at least one being swingable to form a convergent throat therebetween, and means for swinging same to capture an animal therebetween, whereby a captured animal is prevented from entering the vat until a submerged animal ahead of same in the vat exits therefrom.

34. Apparatus in accordance with claim 33, including:

dunking means disposed above the vat and movable downwardly under control of an operator for forcing an animal in the vat below the surface of the liquid therein.

35. Apparatus in accordance with claim 31 in combination with a mobile vehicle on which the named devices are mounted.

36. Apparatus in accordance with claim 35, wherein:

the vehicle is provided with a central partition forming a pair of longitudinal parallel passageways which are connected together at one end of the trailer to permit the animal to move through a 180° turn, the named devices being disposed in one passageway and so arranged that an animal enters same at the rear end of the trailer, moves longitudinally to the front end, turns 180°, and then moves in the opposite direction to an exit in the other passageway.

37. Apparatus in accordance with claim 36, including;

a ballast tank beneath the second named passageway to which liquid in the vat may be transferred to thereby shift the center of mass of the vehicle to a point midway between its sides to thereby obviate eccentric loading of the vehicle when in motion.

38. Apparatus in accordance with claim 36, including:

a longitudinal central barrier between the passageways at the tops thereof, other like barriers at the tops of outer sides of the passageways, the barriers being of sufficient height to prevent an animal from climbing out of the passageways, the barriers being movable to a lowered position during movement of the vehicle to a stowed position at which the overall height of the vehicle complies with height limit regulations for permitting the vehicle to pass beneath overhead road obstructions.

39. Apparatus in accordance with claim 36, including;

an engine carried by the vehicle for driving a hydraulic pump for operating the various movable devices on the vehicle and for driving a liquid pump for transferring liquids carried by tanks on the vehicle or to or from loci near the vehicle, such as a source of water supply or a locus of liquid disposal.

40. Apparatus in accordance with claim 36, including:

an operator's station at which movement of animals may be observed, and controls thereat for controlling the operations of at least the conveyor, the barriers, the dunking means, and the false bottom.

* * * * *